United States Patent
Kuo et al.

(10) Patent No.: US 9,851,891 B2
(45) Date of Patent: Dec. 26, 2017

(54) INTERACTIVE PROJECTION SYSTEM AND PROJECTION METHOD THEREOF

(71) Applicant: Coretronic Corporation, Hsin-Chu (TW)

(72) Inventors: Pen-Ning Kuo, Hsin-Chu (TW); Chung-Lung Yang, Hsin-Chu (TW); Kun-Rong Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 10 days.

(21) Appl. No.: 15/046,462

(22) Filed: Feb. 18, 2016

(65) Prior Publication Data

US 2016/0357347 A1 Dec. 8, 2016

(30) Foreign Application Priority Data

Jun. 8, 2015 (CN) .......................... 2015 1 0308246

(51) Int. Cl.
| | | |
|---|---|---|
| *G03B 17/54* | (2006.01) | |
| *G03B 21/10* | (2006.01) | |
| *G06F 3/0488* | (2013.01) | |
| *G06F 3/041* | (2006.01) | |
| *G03B 21/56* | (2006.01) | |
| *G06F 1/16* | (2006.01) | |
| *G09G 5/12* | (2006.01) | |

(52) U.S. Cl.
CPC ........... *G06F 3/0488* (2013.01); *G03B 17/54* (2013.01); *G03B 21/10* (2013.01); *G03B 21/56* (2013.01); *G06F 1/1645* (2013.01); *G06F 3/0416* (2013.01); *G09G 5/12* (2013.01)

(58) Field of Classification Search
CPC ........ G03B 17/54; G03B 21/00; G03B 21/10; G03B 21/56; G06F 3/0488; G06F 3/0416; G06F 3/04883; G09G 5/12
See application file for complete search history.

(56) References Cited

U.S. PATENT DOCUMENTS

| | | | |
|---|---|---|---|
| 7,372,456 B2 * | 5/2008 | McLintock ........... | G06F 3/0428 178/18.01 |
| 8,102,377 B2 * | 1/2012 | Sirotich ................ | G06F 3/0428 345/173 |
| 8,487,910 B2 * | 7/2013 | Hill ........................ | G06F 3/0488 345/175 |
| 8,700,097 B2 * | 4/2014 | Kim ........................ | G06F 3/147 345/156 |
| 9,152,277 B1 * | 10/2015 | Beguin ................... | G06F 3/044 |
| 9,274,699 B2 * | 3/2016 | Mason ................... | G06F 3/0425 |

(Continued)

FOREIGN PATENT DOCUMENTS

| | | | |
|---|---|---|---|
| CN | 203102200 | 7/2013 | |
| TW | M262370 | 4/2005 | |
| WO | WO 2015047401 A1 * | 4/2015 | .......... H04N 9/3194 |

*Primary Examiner* — Dismery Mercedes
(74) *Attorney, Agent, or Firm* — JCIPRNET

(57) ABSTRACT

An interactive projection system and a projection method thereof are provided. The interactive projection system includes a projection region, a projection device, a touch device and a host. The touch device is movably disposed on the projection region. The projection device projects a corresponding input interface on a touch sensing surface of the touch device according to a position of the touch device, so as to improve usage convenience of the projection system.

15 Claims, 3 Drawing Sheets

(56) References Cited

U.S. PATENT DOCUMENTS

| | | | |
|---|---|---|---|
| 9,544,556 B2 * | 1/2017 | Hiroi | G03B 21/10 |
| 2004/0100388 A1 | 5/2004 | Yoshida et al. | |
| 2005/0083301 A1 * | 4/2005 | Tamura | G06F 3/0418 345/158 |
| 2008/0018591 A1 * | 1/2008 | Pittel | G06F 1/1616 345/156 |
| 2010/0103330 A1 * | 4/2010 | Morrison | G06F 3/0412 348/744 |
| 2011/0154233 A1 * | 6/2011 | Lamarca | G06F 3/0425 715/764 |
| 2014/0191970 A1 * | 7/2014 | Cho | G06F 3/0488 345/163 |
| 2015/0237319 A1 * | 8/2015 | Tsai | G03B 21/208 345/175 |
| 2016/0316186 A1 * | 10/2016 | Krishnakumar | G06F 3/044 |

\* cited by examiner

INTERACTIVE PROJECTION SYSTEM AND PROJECTION METHOD THEREOF

CROSS-REFERENCE TO RELATED APPLICATION

This application claims the priority benefit of China application serial no. 201510308246.X, filed on Jun. 8, 2015. The entirety of the above-mentioned patent application is hereby incorporated by reference herein and made a part of this specification.

BACKGROUND OF THE INVENTION

Field of the Invention

The invention relates to an electronic device, and particularly relates to an interactive projection system and a projection method thereof.

Description of Related Art

As electronic devices are developed to have multiple functions, a conventional button-type operation interface is gradually unable to meet the needs of users. In this case, an interactive touch technique is quickly developed. Compared with the conventional button-type operation interface, an input manner of an interactive touch operation interface is more simple and intuitive, and the user can directly perform a touch input on a display surface of the electronic device by using a finger or a stylus.

A conventional projection screen does not have a touch function, so that control thereof is implemented only through an input tool such as a keyboard or a mouse, etc. However, such input manner is very inconvenient to a user giving a speech in front of the projection screen since a scope of actions and activities of the user giving the speed is limited by the keyboard and the mouse, such that the user is not easy to present the speech content in a natural and vivid way.

The information disclosed in the "BACKGROUND OF THE INVENTION" section is only for enhancement of understanding of the background of the described technology and therefore it may contain information that does not form the prior art that is already known to a person of ordinary skill in the art. Further, the information disclosed in the "BACKGROUND OF THE INVENTION" section does not mean that one or more problems to be resolved by one or more embodiments of the invention were acknowledged by a person of ordinary skill in the art.

SUMMARY OF THE INVENTION

The invention is directed to an interactive projection system and a projection method thereof, which combines a conventional projection screen to achieve a touch function, so as to improve usage convenience of the projection system.

Other objects and advantages of the invention can be further illustrated by the technical features broadly embodied and described as follows.

In order to achieve one or a part of or all of the objects or other objects, an embodiment of the invention provides an interactive projection system including a projection region, a projection device, a touch device and a host. The projection device projects an image beam to display a projection image on the projection region. The touch device has a touch sensing surface, and the touch device is movably disposed on the projection region. The host electrically connects the projection device with the touch device, wherein when the touch sensing surface is located inside the projection region, the host controls the projection device to project a first input interface on the touch sensing surface, and when the touch sensing surface is located outside the projection region, the host controls the projection device to stop projecting the first input interface.

In an embodiment of the invention, when the touch sensing surface is located outside the projection region, the host disables the touch device.

In an embodiment of the invention, when the touch sensing surface is located outside the projection region, the host ignores a touch sensing signal coming from the touch device.

In an embodiment of the invention, the interactive projection system further includes at least one position sensing unit, which senses a position of the touch sensing surface on the projection region.

In an embodiment of the invention, the touch device includes a touch sensing unit and a control unit. The touch sensing unit senses a touch operation on the touch sensing surface. The control unit is electrically connected to the touch sensing unit, and outputs a touch sensing signal to the host according to a sensing result of the touch sensing unit.

In an embodiment of the invention, the control unit is electrically connected to the position sensing unit, and outputs a position signal to the host according to a sensing result of the position sensing unit, and the host determines the position of the touch sensing surface according to the position signal.

In an embodiment of the invention, the touch device further includes a communication unit. The communication unit is electrically connected to the control unit, and the control unit transmits the touch sensing signal and the position signal to the host through the communication unit.

In an embodiment of the invention, the position sensing unit is coupled to the host, and the host determines the position of the touch sensing surface according to a sensing result of the position sensing unit.

In an embodiment of the invention, the position sensing unit is a limit switch. The position sensing unit is disposed at periphery of the projection region to sense the position of the touch sensing surface.

In an embodiment of the invention, the touch device is movably disposed on the projection region through at least one slide rail, and the position sensing unit senses a position of the touch sensing surface on the slide rail.

In an embodiment of the invention, a part of the touch sensing surface is located inside the projection region, and the host controls the projection device to display a second input interface on the touch sensing surface.

An embodiment of the invention provides a projection method for an interactive projection system, and the method includes following steps. An image beam is projected, and a projection image is displayed on a projection region. A position of a touch sensing surface of a touch device on the projection region is sensed, wherein the touch device is movably disposed on the projection region. A first input interface is displayed on the touch sensing surface according to the position of the touch sensing surface on the projection region.

In an embodiment of the invention, the projection method for the interactive projection system further includes following steps. It is determined whether the touch sensing surface is located inside or outside the projection region, and if the touch sensing surface is located outside the projection region, the touch device is disabled.

In an embodiment of the invention, the projection method for the interactive projection system further includes following steps. It is determined whether the touch sensing surface is located inside or outside the projection region, and if the touch sensing surface is located outside the projection region, a touch sensing signal coming from the touch device is ignored.

In an embodiment of the invention, the projection method for the interactive projection system further includes a following step. If a part of the touch sensing surface is located inside the projection region, the projection device displays a second input interface on the touch sensing surface.

According to the above descriptions, the touch device of the invention is movably disposed on the projection region, and according to different positions of the touch device, the corresponding input interface is projected on the touch sensing surface of the touch device, such that the projection region has the touch function, so as to improve usage convenience of the projection system.

In order to make the aforementioned and other features and advantages of the invention comprehensible, several exemplary embodiments accompanied with figures are described in detail below.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1A:
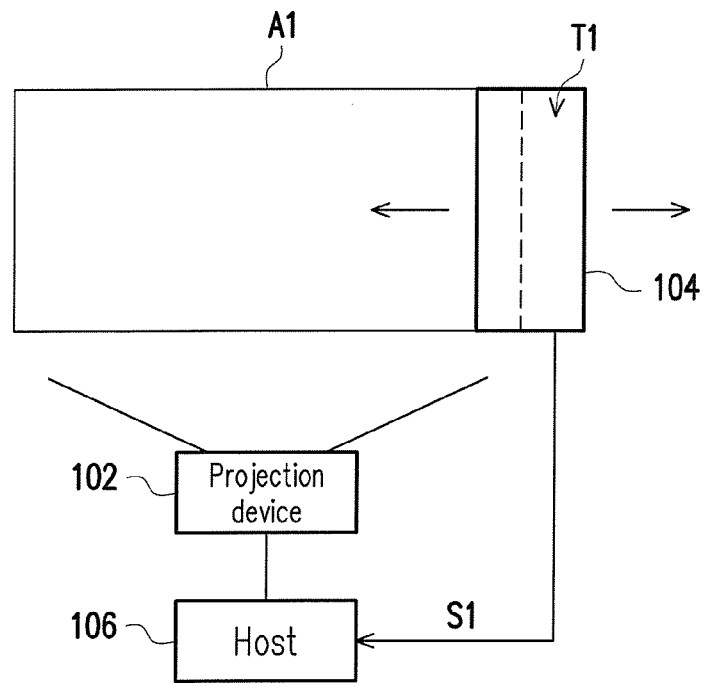
FIG. 1A is a schematic diagram of an interactive projection system according to an embodiment of the invention.

FIG. 1A is a schematic diagram of an interactive projection system according to an embodiment of the invention. Referring to FIG. 1A, the interactive projection system includes a projection device 102, a touch device 104 and a host 106, where the host 106 electrically connects the projection device 102 with the touch device 104. The projection device 102 projects an image beam to display a projection image on a projection region A1, where the projection region A1 is, for example, a projection screen, a whiteboard, a wall or other plane suitable for receiving the projecting images. The touch device 104 has a touch sensing surface T1, and the touch device 104 is movably disposed at any position on the projection region A1. In the embodiment, the projection region A1 is, for example, perpendicular to the ground, though the invention is not limited thereto, and the touch sensing surface T1 of the touch device 104, for example, has a same height with that of the projection region A1, and can be moved laterally, and a moving direction of the touch sensing surface T1 is not limited, and the touch sensing surface T1 of the touch device 104 can be disposed at any position on the projection region A1, or can be moved to external of the projection region A1. The touch device 104 can sense a touch operation of an input tool, and correspondingly generates a touch sensing signal S1. The touch device 104 is, for example, a capacitive touch device, a resistive touch device or an electromagnetic touch device, etc., and the input tool is, for example, a finger or a stylus, etc., which is not limited by the invention. It should be noted that a size and a shape of the touch sensing surface T1 are not limited by the invention, and the moving direction of the touch sensing surface T1 is also not limited by the invention. In other embodiments, the height and width of the touch sensing surface T1 can be respectively smaller than the height and width of the projection region A1, and besides that the touch sensing surface T1 can move laterally in the projection region A1, it can also move vertically or moved freely in the projection region A1.

Moreover, the host 106 can control a content of an image projected by the projection device 102. Further, the host 106 can control the image projected by the projection device 102 according to a position of the touch sensing surface T1. For example, when the touch sensing surface T1 is located inside the projection region A1, the host 106 controls the projection device 102 to project a first input interface on the touch sensing surface T1, and when the touch sensing surface T1 is located outside the projection region A1, the host 106 controls the projection device 102 to stop projecting the first input interface. When the touch sensing surface T1 is located outside the projection region A1, the host 106 disables the touch device 104 or ignores the touch sensing signal S1 coming from the touch device 104, and now since the host 106 does not act in response to a touch operation on the touch sensing surface T1, the user can use the touch sensing surface T1 as a whiteboard.

Figure 1B:
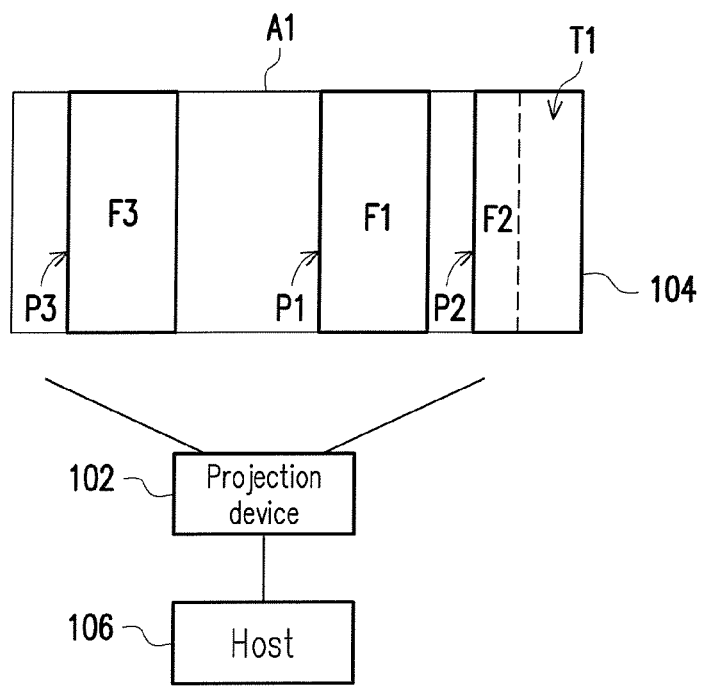
FIG. 1B is a schematic diagram of an interactive projection system according to an embodiment of the invention.

In the embodiment, the host 106 can further control a content of the image projected by the projection device 102 according to the position of the touch sensing surface T1, as shown in FIG. 1B, when the touch sensing surface T1 is located at a first position P1 (for example, a right side of the projection region A1) in the projection region A1, the host 106 can control the projection device 102 to project a first input interface F1 on the touch sensing surface T1, and when the touch sensing surface T1 is located at a second position P2 (i.e. only a part of the touch sensing surface T1 is located inside the projection region A1), the host 106 controls the projection device 102 to project a second input interface F2 on the touch sensing surface T1. Moreover, when the touch sensing surface T1 is located at a third position P3 (for example, a left side of the projection region A1) in the projection region A1, the host 106 controls the projection device 102 to project a third input interface F3 on the touch sensing surface T1, where a display content of the first input interface F1 and the third input interface F3 can be the same or different, which is not limited by the invention.

Therefore, by movably disposing the touch device 104 on the projection region A1, and projecting the corresponding input interface on the touch sensing surface T1 of the touch device 104 according to the position of the touch device 104, the projection region A1 may have a touch function, and when the touch sensing surface T1 is located outside the projection region A1, the touch function of the touch sensing surface T1 can be disabled or the touch sensing signal coming from the touch device can be ignored, and the touch sensing surface T1 can be used as a whiteboard, by which the usage convenience of the projection system is greatly improved. Moreover, since the touch device 104 is movably disposed on the projection region A1, the user can execute a touch operation at any position on the projection region A1 by only adjusting the position of the touch sensing surface T1, and the touch sensing surface T1 is unnecessary to be distributed all over the projection region A1, such that an effect of executing the touch function at any position of the projection region is achieved in a low cost.

Figure 2:
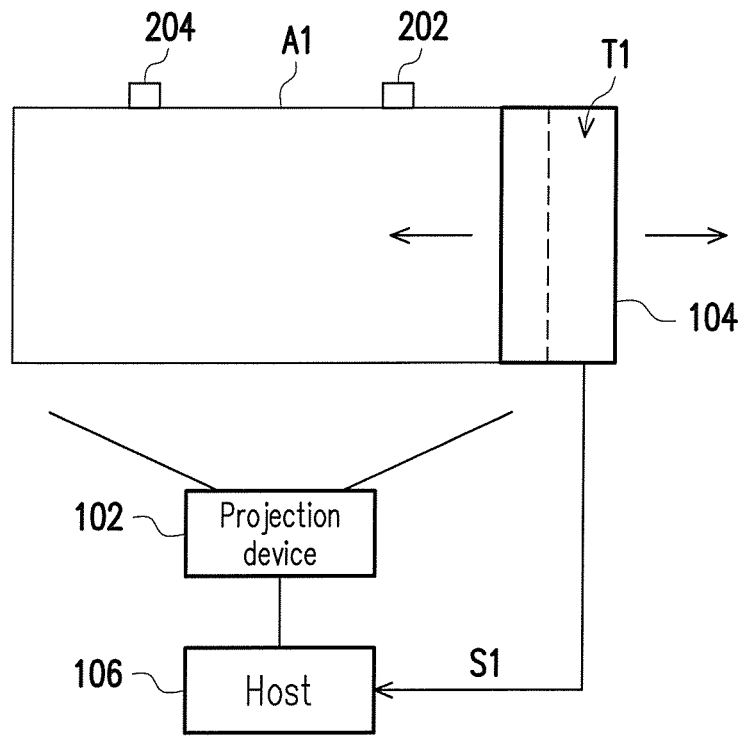
FIG. 2 is a schematic diagram of an interactive projection system according to an embodiment of the invention.

FIG. 2 is a schematic diagram of an interactive projection system according to an embodiment of the invention. Referring to FIG. 2, in detail, the interactive projection system may include at least one position sensing unit. In the embodiment, the interactive projection system, for example, includes position sensing units 202 and 204, and the position sensing units 202 and 204 are respectively disposed at an edge of the projection region A1, and are electrically connected to the touch device 104 for sensing a position of the touch sensing surface T1 of the touch device 104 on the projection region A1, and outputting a position signal to the touch device 104. Further, the touch device 104 can be movably disposed on the projection region A1 through at least one slide rail (not shown). For example, the touch device 104 can be disposed at an upper and a lower sides of the projection region A1, such that the touch device 104 can move laterally along the slide rail, or the touch device 104 can be disposed at a left and a right sides of the projection region A1, such that the touch device 104 can move vertically along the slide rail. The position sensing units 202 and 204 are, for example, the limit switches, which are disposed on the slide rail for sensing a position of the touch sensing surface T1 on the slide rail. When the touch device 104 contacts the position sensing units 202 and 204 to turn on the position sensing units 202 and 204, it represents that the touch sensing surface T1 is moved to the position of the corresponding limit switch. For example, when the position sensing unit 202 is turned on, it represents that the touch sensing surface T1 is moved to the position of the position sensing unit 202. However, the invention is not limited thereto, in other embodiments, the position sensing units 202 and 204 may respectively include an infrared transmitter and an infrared receiver. The infrared transmitter and the infrared receiver can be disposed on two opposite sides of the projection region A1 for sensing the position of the touch sensing surface T1, where the infrared receiver can receive a light signal transmitted by the corresponding infrared transmitter. If the infrared receiver cannot receive the light signal transmitted by the corresponding infrared transmitter, it represents that the touch sensing surface T1 is moved to the position of the corresponding infrared receiver and infrared transmitter (i.e. the position of the corresponding position sensing unit).

Figure 3:
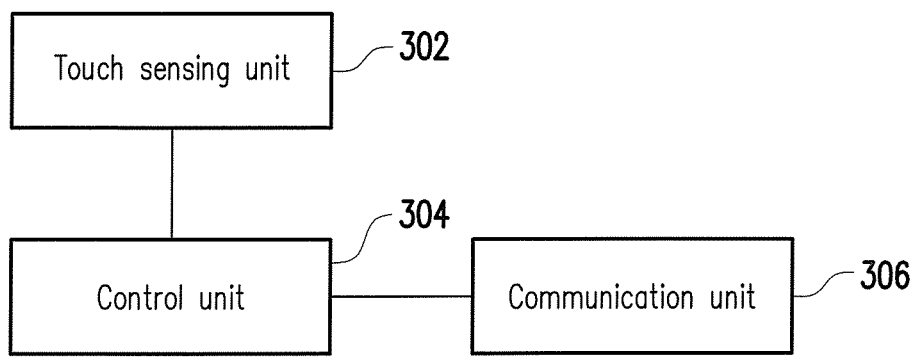
FIG. 3 is a schematic diagram of a touch device according to an embodiment of the invention.

Moreover, as shown in FIG. 3, the touch device 104 may include a touch sensing unit 302, a control unit 304 and a communication unit 306. The control unit 304 is electrically connected to the touch sensing unit 302, the communication unit 306 and the aforementioned position sensing units 202 and 204, where the touch sensing unit 302 is, for example, a control circuit board located at a backside of a capacitive touch panel, and can sense a touch operation performed on the touch sensing surface T1. The control unit 304 is, for example, a central processing unit (CPU) having a single core or a multiple cores or a programmable general purpose or special purpose microprocessor. The control unit 304 can output a touch sensing signal to the host 106 according to a sensing result of the touch sensing unit 302. Further, the control unit 304 can transmit the touch sensing signal and position signals generated by the position sensing units 202 and 204 to the host 106 through the communication unit 306, where the communication unit 306, for example, transmits the position signals to the host 106 through Wi-Fi, bluetooth, ZigBee network interface, wireless sensor network (WSN) interface or other wireless communication methods, and the host 106 determines the position of the touch sensing surface T1 according to the position signals, and controls the projection device 102 to project the corresponding image.

It should be noted that in other embodiments, the position sensing units 202 and 204 can also be electrically connected to the host 106, and directly transmit the position signals to the host 106 other than transmitting the position signals to the host 106 through the communication unit 306. Moreover, the control unit 302 of the touch device 104 can also be disposed in the host 106, which is not limited by the invention.

Figure 4:
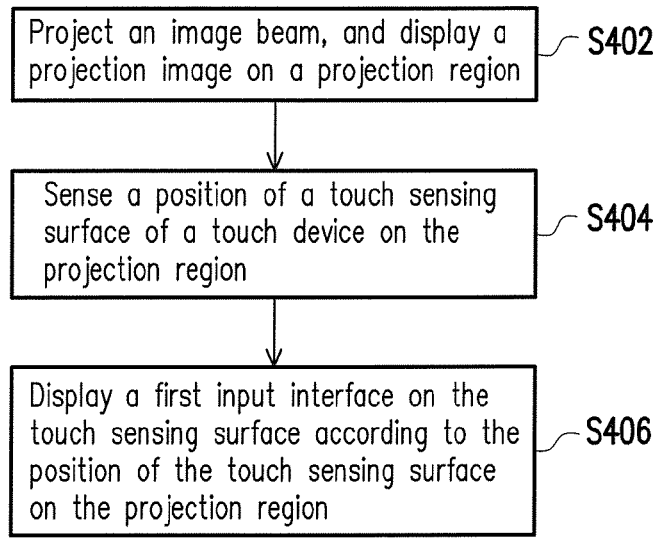
FIG. 4 is a flowchart illustrating a projection method for an interactive projection system according to an embodiment of the invention.

FIG. 4 is a flowchart illustrating a projection method for an interactive projection system according to an embodiment of the invention. Referring to FIG. 4, according to the aforementioned embodiments, it is known that the projection method for the interactive projection system may include following steps. First, an image beam is projected, and a projection image is displayed on a projection region (step S402). Then, a position of a touch sensing surface of a touch device on the projection region is sensed (step S404), where the touch device is movably disposed on the projection region. Then, a first input interface is displayed on the touch sensing surface according to the position of the touch sensing surface on the projection region (step S406), where when a part of the touch sensing surface is located inside the projection region, and the other part of the touch sensing surface is located outside the projection region, the projection device displays a second input interface on the touch sensing surface.

Figure 5:
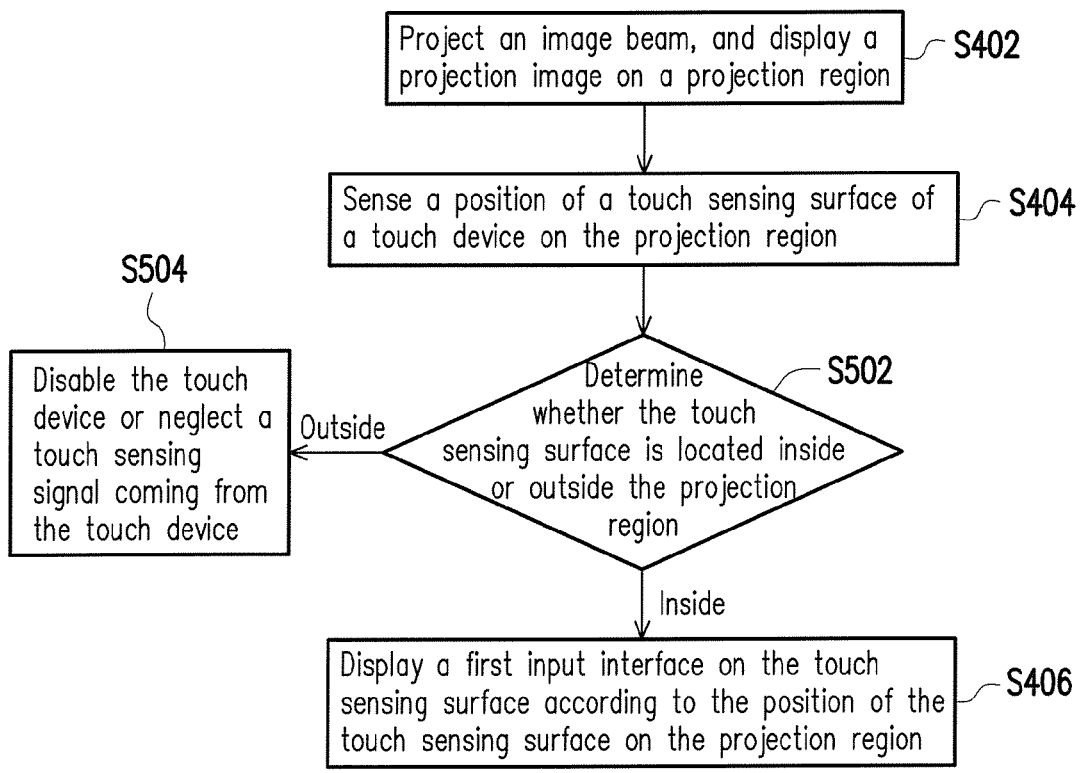
FIG. 5 is a flowchart illustrating a projection method for an interactive projection system according to another embodiment of the invention.

FIG. 5 is a flowchart illustrating a projection method for an interactive projection system according to another embodiment of the invention. Referring to FIG. 5, the embodiment of FIG. 5 is similar to the embodiment of FIG. 4, and the same steps are denoted by the same referential numbers, and differences therebetween are as follows. After the step S404, it is determined whether the touch sensing surface is located inside the projection region or outside the projection region (step S502), if the touch sensing surface is located outside the projection region, the touch device is disabled, or a touch sensing signal coming from the touch device is ignored (step S504). Conversely, if the touch sensing surface is located inside the projection region, the step S406 is executed, by which the first input interface is displayed on the touch sensing surface according to the position of the touch sensing surface on the projection region.

In summary, by movably disposing the touch device on the projection region, and projecting the corresponding input interface on the touch sensing surface of the touch device according to the position of the touch device, the projection region may have a touch function. When the touch sensing surface is located outside the projection region, the touch function of the touch sensing surface can be disabled or the touch sensing signal coming from the touch device can be ignored, and the touch sensing surface can be used as a whiteboard, by which the usage convenience of the projection system is greatly improved. Moreover, since the touch device is movably disposed on the projection region, the user can execute a touch operation at any position on the projection region by only adjusting the position of the touch sensing surface, and the touch sensing surface is unnecessary to be distributed all over the projection region, such that an effect of executing the touch function at any position of the projection region is achieved in a low cost.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An interactive projection system, comprising:
a projection region;
a projection device, projecting an image beam to display a projection image on the projection region;
a touch device, having a touch sensing surface, and movably disposed on the projection region; and
a host, electrically connecting the projection device with the touch device, and configured to determine whether the touch sensing surface is located inside the projection region, the touch sensing surface is located outside the projection region or a part of the touch sensing surface is located inside the projection region,
wherein when the touch sensing surface is located inside the projection region, the host controls the projection device to project a first input interface on the touch sensing surface, and when the touch sensing surface is located outside the projection region, the host controls the projection device to stop projecting the first input interface and the host takes no action in response to a touch operation on the touch sensing surface.

2. The interactive projection system of claim 1, wherein when the touch sensing surface is located outside the projection region, the host disables the touch device.

3. The interactive projection system of claim 1, wherein when the touch sensing surface is located outside the projection region, the host ignores a touch sensing signal corning from the touch device.

4. The interactive projection system of claim 1, further comprising:
at least one position sensing unit, sensing a position of the touch sensing surface on the projection region.

5. The interactive projection system of claim 4, wherein the touch device comprises:
a touch sensing unit, sensing the touch operation on the touch sensing surface; and
a control unit, electrically connected to the touch sensing unit, and outputting a touch sensing signal to the host according to a sensing result of the touch sensing unit.

6. The interactive projection system of claim 5, wherein the control unit is electrically connected to the at least one position sensing unit, the control unit generates a position signal according to a sensing result of the at least one position sensing unit, and outputs the position signal to the host, and the host determines the position of the touch sensing surface according to the position signal.

7. The interactive projection system of claim 6, wherein the touch device further comprises a communication unit electrically connected to the control unit, and the control unit transmits the touch sensing signal and the position signal to the host through the communication unit.

8. The interactive projection system of claim 4, wherein the at least one position sensing unit is coupled to the host, and the host determines the position of the touch sensing surface according to a sensing result of the position sensing unit.

9. The interactive projection system of claim 4, wherein the at least one position sensing unit is a limit switch disposed at periphery of the projection region to sense the position of the touch sensing surface.

10. The interactive projection system of claim 4, wherein the touch device is movably disposed on the projection region through at least one slide rail, and the position sensing unit senses a position of the touch sensing surface on the at least one slide rail.

11. The interactive projection system of claim 1, wherein a part of the touch sensing surface is located inside the projection region, and the host controls the projection device to display a second input interface on the touch sensing surface.

12. A projection method for an interactive projection system, comprising:
   projecting an image beam, and displaying a projection image on a projection region;
   sensing a position of a touch sensing surface of a touch device on the projection region, wherein the touch device is movably disposed on the projection region;
   determining whether the touch sensing surface is located inside the projection region, the touch sensing surface is located outside the projection region or a part of the touch sensing surface is located inside the projection region;
   displaying a first input interface on the touch sensing surface when the touch sensing surface is located inside the projection region; and
   taking no action in response to a touch operation on the touch sensing surface when the touch sensing surface is located outside the projection region.

13. The projection method for the interactive projection system of claim 12, further comprising:
   disabling the touch device when the touch sensing surface is located outside the projection region.

14. The projection method for the interactive projection system of claim 12, further comprising:
   ignoring a touch sensing signal coming from the touch device when the touch sensing surface is located outside the projection region.

15. The projection method for the interactive projection system of claim 12, further comprising:
   displaying a second input interface on the touch sensing surface by the projection device if a part of the touch sensing surface is located inside the projection region.

* * * * *